Dec. 16, 1952  J. JACUZZI  2,621,596
PRESSURE SYSTEM
Filed Nov. 13, 1945  3 Sheets-Sheet 1
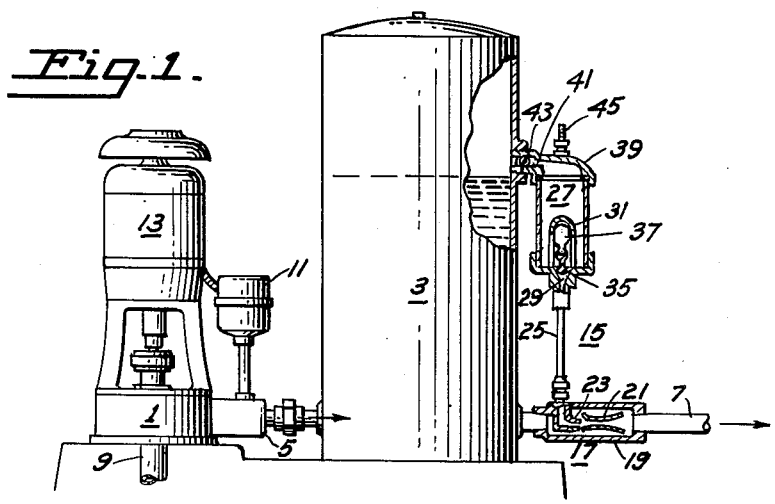
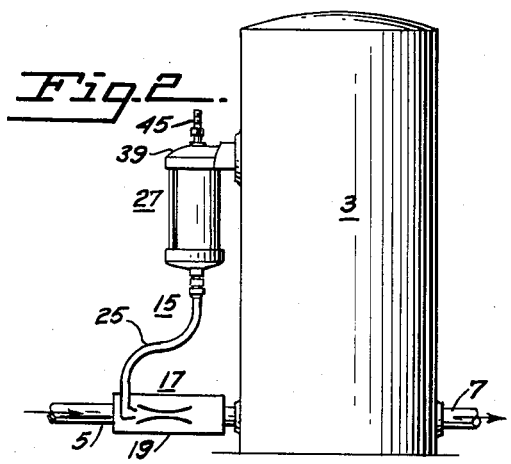
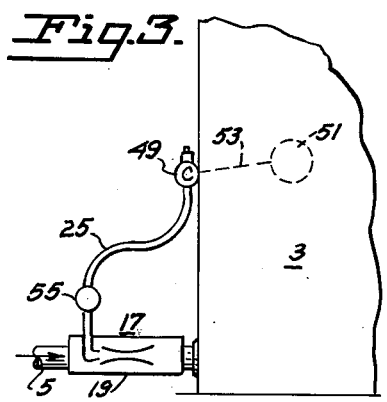
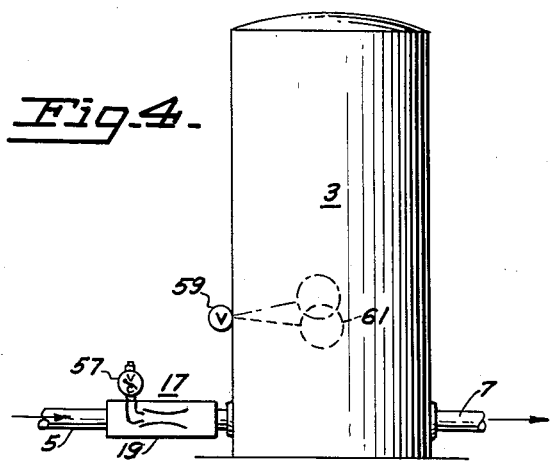
INVENTOR.
JOSEPH JACUZZI
BY Charles O. Bruce
ATTORNEY Dec. 16, 1952  J. JACUZZI  2,621,596
PRESSURE SYSTEM
Filed Nov. 13, 1945  3 Sheets-Sheet 2

INVENTOR.
JOSEPH JACUZZI
BY Charles O. Bruce
ATTORNEY

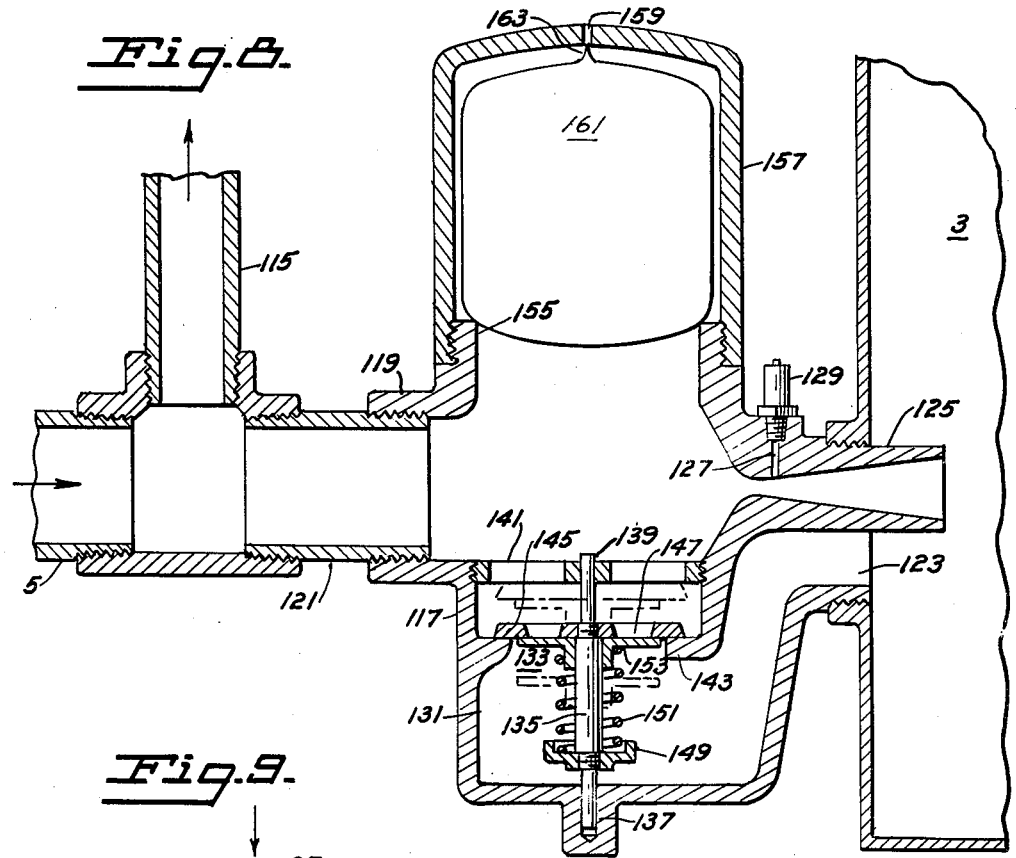
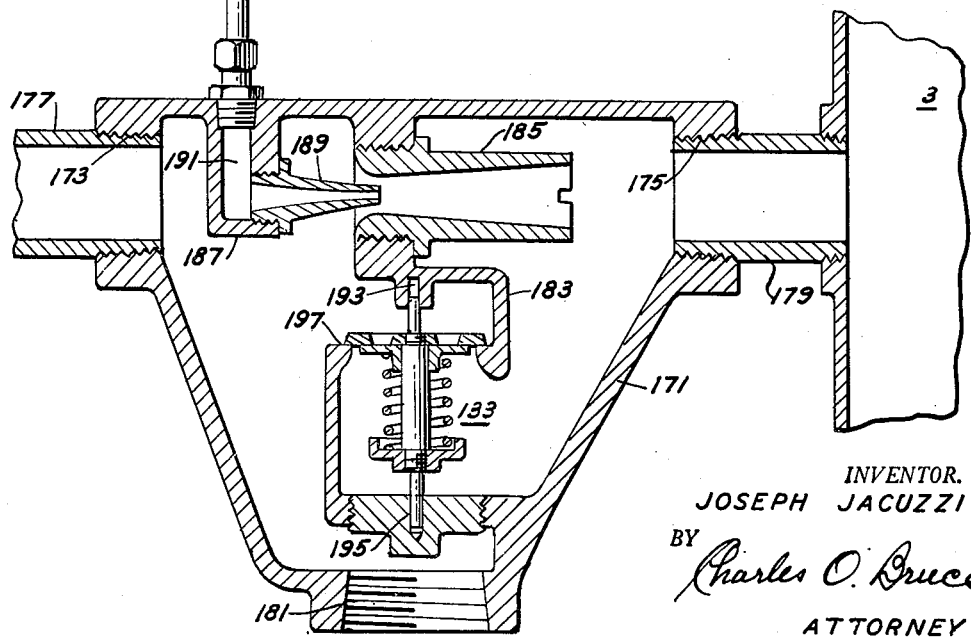

Patented Dec. 16, 1952

2,621,596

UNITED STATES PATENT OFFICE 2,621,596

PRESSURE SYSTEM

Joseph Jacuzzi, Berkeley, Calif., assignor to Jacuzzi Bros., Incorporated, a corporation of California Application November 13, 1945, Serial No. 628,140

9 Claims. (Cl. 103—6)

My invention relates to pressure systems and more particularly to pump pressure systems involving a super-charged tank.

In a pump pressure system, pressure is normally maintained by an air cushion in a pressure tank. In a conventional system of this type, the liquid under pressure in such a tank gradually absorbs air from the air cushion and the amount of liquid which can be removed from a given-size tank at a given pressure range is thus greatly reduced. The loss of air cushion in this manner, ultimately results in a condition known as "water logging." This condition manifests itself by all too frequent operation of the pump with little or no liquid being drawn from the system. Such operation is injurious to the pump motor and control switch, and will often cause the motor to burn up or the switch contacts to fuse or stick. By replenishing the air loss from the air cushion, this condition can be largely remedied.

It has been found possible, however, to effectively increase the capacity of a given tank, that is, the amount of water which can be drawn per pump cycle of operation, by introducing into the tank a greater volume of air cushion than would normally be realized by the mere pumping of water into a previously empty tank. This is known as super-charging the tank, and aside from the effective increase in capacity thus realized, the super-charged pump pressure system requires less pump operation and accordingly involves less wear on the motor starting and switch mechanisms, with a resulting longer life of the aforementioned equipment.

Among the objects of my invention are: :

(1) To provide a novel and improved pump pressure system;

(2) To provide a novel and improved pump pressure system having means for supercharging a pressure tank, wherein the replenishing of the air cushion in such tank will entail no risk of causing the pump to become air-bound;

(3) To provide a pump system with a novel and improved means for super-charging a pressure tank;

(4) To provide a novel and improved pump pressure system having a super-charger which is isolated from the input side of the pump;

(5) To provide a novel and improved pump pressure system having a super-charger therein capable of functioning independently of the pump;

(6) To provide a novel and improved pump pressure system having a super-charger therein, whose operation is independent of the type of pump employed in the system;

(7) To provide a novel and improved pump pressure system including a pressure tank, wherein the air cushion charging cycle is more frequent than in a conventional system wherein the charging cycle is made responsive to pump operation;

(8) To provide a novel and improved pump pressure system of the super-charged type having greater assurance of maintaining a super-charged condition therein;

(9) To provide a novel and improved super-charger assembly for use in a pump pressure system;

(10) To provide a novel and improved super-charger assembly whose operation in a pump pressure system may be made independent of the type of pump employed;

(11) To provide a novel and improved super-charger assembly whose operation in a pump pressure system can be made responsive to withdrawal of water from such system.

Additional objects of my invention will be brought out in the following description of preferred embodiments of the same taken in conjunction with the accompanying drawings wherein—

Figure 1 is a schematic showing of a pump pressure system of my invention embodying a super-charger assembly of one type;

Figure 2 is a similar showing of a pump pressure system with the same type of super-charger assembly, but disposed in another part of the system;

Figure 3 is a schematic showing of a pump pressure system utilizing a modified type of super-charger assembly;

Figure 4 is a schematic showing of a pump pressure system utilizing still another type of super-charger assembly;

Figure 8 is a fragmentary view in section of a pump pressure system having a service line common to both the pump and pressure tanks, and depicting an improved super-charger assembly adapted for use in such system;

Figure 9 is a view in section depicting a structurally different super-charger assembly from that of Figure 8 but useable in a pump pressure system wherein the service line is common to both the pump and pressure tanks.

Figure 5:
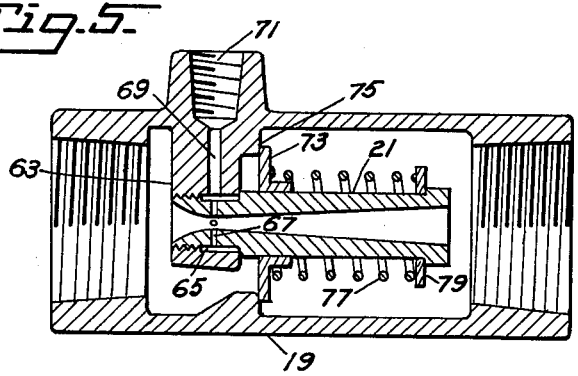
Figure 5 is a view in section of an aspirator arrangement common to all the super-charger assemblies of Figures 1 through 5.

Referring to the drawings for details of my invention, the system of Figure 1 illustrates one application of my invention to a pump pressure system of conventional type, including a pump 1 connected on its discharge side to a pressure tank 3 by means of a discharge line 5, the pressure tank in turn discharging through a service line 7 to the plurality of consumer outlets (not shown) normally associated with such system. The pump draws its water from a well or other source through an intake or suction line 9 in conventional manner. A pressure switch 11 responsive to pressure conditions within the pressure tank 3 serves to connect and disconnect the pump motor 13, and thus determine the operating cycle of the pump.

In connection with such system, I have illustrated one embodiment of my invention in the form of a super-charger assembly 15 adapted to introduce air into the air cushion in response to withdrawal of water from the pressure tank by the consumer. Such super-charger assembly includes an aspirator 17 disposed in the service line 7 and adapted, in response to the flow of liquid from the tank, to create within itself, a region of reduced pressure, which in this case is sub-atmospheric.

The details of construction of such aspirator will be discussed subsequently, in detail in connection with Figure 5, but for the time being, it is sufficient to point out generally that it involves a coupling 19, housing a venturi 21 and a nozzle 23 at the input end of said venturi. A tube 25 extends from the nozzle to a super-charger chamber 27 mounted on the side of the pressure tank 3.

This chamber has a conical valve seat opening 29 in the floor thereof surrounded by a valve cage 31. This opening is adapted to receive the conical end 35 of a float valve 37 housed for movement in the aforementioned cage. This valve, for efficient action, preferably has its conical end sufficiently small to enter the conical valve seat and is formed with an angle exceeding that of the valve seat, to assure a circular line contact for sealing purposes. Preferably the material of this element should be resilient or flexible.

The upper end of the super-charger chamber 27 is closed by a cap 39 having a lateral connection including passage 41 into the pressure tank at approximately the desired liquid level therein. This lateral connection houses a ball check valve 43 adapted to seal the passage 41 when the pressure in the tank exceeds that in the super-charger chamber, but when a condition of equilibrium is established between the two, the ball check valve is neutral. The cap 39 is further provided with an air-intake check valve 45 responsive to a sub-atmospheric pressure in the chamber, to permit intake of air into the chamber.

With the system in a state of quiescence, that is, with no water being withdrawn from the pressure tank, the pressure existing in the pressure tank can be transmitted by way of the aspirator 17 and the tube 25 to the super-charger chamber 27 to establish a condition of equilibrium in the system, whereby the pressure in the super-charger chamber will equal that in the pressure tank. For any liquid level existing in the pressure tank below the level of the lateral connecting passage from the super-charger chamber, a corresponding level will be established in the super-charger chamber. When the level in the pressure tank, however, lies above the point of connection of the lateral connecting passage, the super-charger chamber will of course become full of water.

Upon discharge of water from the pressure tank into the service lines, the region of sub-atmospheric pressure developed in the aspirator will cause withdrawal of liquid from the super-charger chamber, resulting in a lowering of the pressure in the super-charger chamber. The pressure unbalance thus created will cause the ball check valve to block off the passage to the pressure tank.

If at the beginning of discharge, the super-charger chamber were full of liquid, the resulting withdrawal of the same would cause the air-intake check valve to open and permit of the entrance into the super-charger chamber of a supply of air to the system from the outside. Upon shutting off of the discharge from the pressure tank into the service line, the resulting equalization of pressure will cause the freshly introduced air to be forced into the pressure tank to thereby increase the volume of the air cushion.

On the other hand, were the volume of the air cushion in the tank sufficient to hold the liquid level in the pressure tank below the passage from the super-charger chamber thereto, a corresponding air cushion would exist in the super-charger chamber. Consequently, due to the expanding effect of gas, no air would be introduced into the super-charger chamber from the atmosphere until sufficient water were withdrawn from the super-charger chamber to reduce the air cushion pressure therein to a value below atmospheric pressure. Under these conditions, little or no air will be introduced from the outside and equilibrium conditions will remain substantially as they were prior to the discharge from the pressure tank into the service line.

The system, as set up in Figure 2, differs from that of Figure 1 in the location of the aspirator, which has now been placed in the discharge line 5 from the pump 1 to the pressure tank 3. With the aspirator located in this part of the pump pressure system, the super-charger assembly functions in response to flow from the pump to the pressure tank. Its cycle of operation therefore is timed with that of the pump cycle, whereas in the system of Figure 1, the cycle of operation of the super-charger assembly was independent of the pump cycle of operation, but tied in with the withdrawal of water from the pressure tank.

In the system of Figure 3, the super-charger chamber has been replaced by a float-controlled valve 49 which in its open condition, exposes the aspirator to intake of air directly from the external atmosphere, for mixture with the liquid flow into the pressure tank. The valve is mounted on the outer side of the pressure tank at approximately the desired liquid level in the tank, and is controlled by a float 51 mounted on the end of a valve control lever 53 and supported by the liquid in the tank.

Under conditions of adequate air cushion volume in the pressure tank, the position of the float is such as to hold the valve in its closed condition. However, should the air cushion volume decrease beyond its desired minimum volume, the elevated position of the float will open the valve. Upon initiating a pump cycle of operation, in response to a low pressure condition in the pressure tank, the flow of liquid into the pressure tank through the aspirator will create a region of sub-atmospheric pressure and accordingly draw in air through the open valve from the atmosphere. Such air of course will mix with the inflowing liquid into the pressure tank and replenish the deficiency in air cushion volume. In this system, a check valve 55 is essential in the tube 25 connecting the aspirator and the float controlled valve, to preclude loss of liquid from the system should the valve remain open during reestablishment of equilibrium throughout the system.

In the system of Figure 4, the aspirator 17 has a direct connection to the atmosphere through a check valve 57, preferably one of the Schrader type, the operation of which is controlled by the development of sub-atmospheric pressure within the aspirator. In this embodiment of my invention, the amount of air introduced into the pressure tank is independent of the air cushion volume, the apparatus preferably being designed to supply an excess of air into the pressure tank. The desired air cushion volume is thereupon maintained through the utilization of a bleeder valve 59 which is controlled by a float 61 in much the same manner as in the system of Figure 3, with the difference, however, that the float will function to open the valve when the float drops below the desired liquid level, and will close the valve when the float rises above the desired liquid level. This is just the reverse operation from that of the system of Figure 3.

All of the aforementioned described systems may utilize, in common, an aspirator of the same construction. The preferred embodiment of such aspirator construction is illustrated in Figure 5, to which reference will now be made.

This comprises the coupling 19 having a flow passage therethrough. This coupling is preferably internally threaded at each end for connection to the pipes of the system at the points of installation. The venturi 21, previously mentioned, is supported longitudinally in the flow passage, preferably by having its restricted end threaded into an opening through a boss 63 depending into the passage from an intermediate point in the coupling. A peripheral groove 65 about the mounting end of the venturi is connected by a plurality of radial passages 67 through the venturi wall to the restricted portion of the venturi passage. From this peripheral groove, a bore 69 through the depending boss and terminating in an outer internally threaded recess 71 completes a passage from a point externally of the coupling to the interior of the venturi at its restricted portion. The internally threaded recess 71 permits of the connection of the tube 25 or valve 57, such as that illustrated in connection with the systems of Figures 1 through 4 inclusive.

The flow passage about the venturi is normally blocked by pressure responsive means adapted to open in response to the building up of flow pressure to a value sufficient to bring about a suitable condition of sub-atmospheric pressure in the restricted region of the venturi. Such pressure will ordinarily be low, of the order of about five pounds between the inlet side of the coupling and the discharge end thereof. Inasmuch as pressure systems operate at pressures of the order of thirty or forty pounds, such small drops in pressure can be tolerated.

The pressure responsive means in the preferred embodiment of the aspirator under consideration may take the form of a valve 73 surrounding the venturi and slidable thereon, and adapted to seat against an internal peripheral shoulder 75 in response to the urging of a compression spring 77 surrounding the venturi and disposed between the valve 73 at one end and a washer 79 mounted at the discharge end of the venturi.

Inasmuch as the valve is designed to withstand the pressure necessary to bring about the desired subatmospheric condition within the venturi, satisfactory operation of the aspirator will be assured at all times. Above this pressure, the valve will open and permit full utilization of the flow passage through the coupling body, thereby permitting the system to function at its full capacity.

Figure 6:
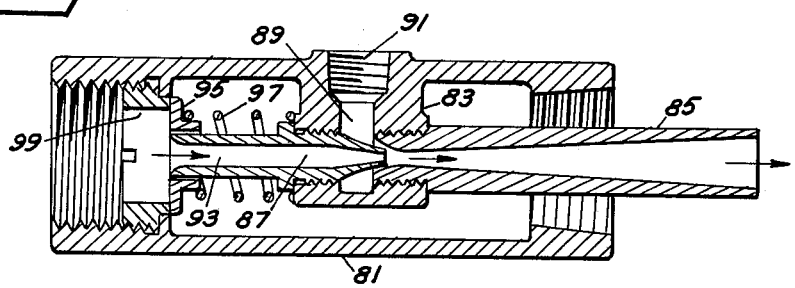
Figure 6 is a view in section of a modified aspirator arrangement which can be employed in lieu of that of Figure 5.

In the aspirator construction of Figure 6, a coupling 81 is provided with an interior boss 83 adapted to support both a venturi 85 and a nozzle 87 in alignment. The boss is bored to provide a passage 89 extending from the inlet end of the venturi to an externally exposed threaded recess 91 for the connection thereto of a tube 25 or other external accessory such as a Schrader valve 57.

The nozzle 87 is provided with a hollow tail extension 93 to slidably carry a valve 95, which under the action of a compression spring 97 is adapted to engage a valve seat formed on the end of an interior collar 99 threaded into the intake end of the coupling. Flow of liquid from the nozzle 87 into the venturi will create a region of reduced pressure at the restricted portion of the venturi passage which will thereby cause to be drawn into the venturi such liquid or gas as may be available for entrance into the aspirator by way of the bore 89 in the boss 83. As the pressure at the intake side of the coupling reaches that value necessary to bring about the desired condition of reduced pressure in the venturi, the valve 95 will open and expose the entire full passage to the flow of liquid through the aspirator.

Figure 7:
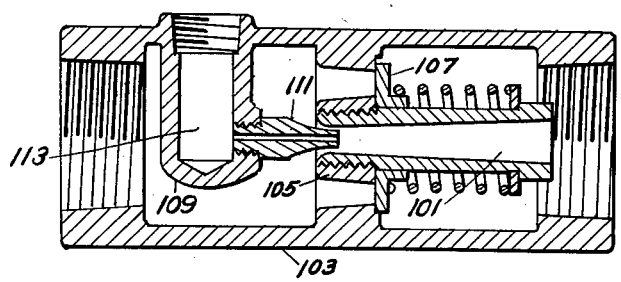
Figure 7 is a view in section of another modified aspirator arrangement adapted for use in lieu of that of Figure 5.

A third type of aspirator construction is illustrated in Figure 7. In this embodiment, a venturi 101 is supported centrally of a coupling 103 in a boss 105, and carries a spring biased valve 107 in much the same manner as that in the preferred embodiment previously described. Another boss 109 within the coupling, is adapted to carry a nozzle 111 in proper alignment with the venturi 101, but in this case, the passage 113 in the boss leads to the entrance to the nozzle, while the main flow of liquid through the coupling 103 is adapted to enter the venturi and create a region of reduced pressure at the discharge end of the nozzle which terminates within the venturi in the region of restriction.

In Figure 8, I have illustrated a super-charger assembly arranged in a single casting and designed for use in a system where the service line 115 is fed directly from either the pump or the pressure tank. The super-charger arrangement corresponds to that of Figure 4 in principle of operation, but the various components thereof are assembled into a single unit, and include certain refinements and modifications of detail, adapting it to a system where the service line may be supplied directly from either the pump or the pressure tank.

Accordingly, I provide a casting 117 having an inlet 119 threaded to receive the discharge line 121 from the pump, and an outlet 123 threaded for connection to a pressure tank 3. This outlet has integrally formed within itself, a venturi 125 which at its restricted portion is provided with a radial bore 127 terminating at its outer end in a threaded recess for the reception of a check valve or preferably a Schrader valve 129 which is adapted, upon opening, to provide access to the atmosphere.

The lower intermediate portion of the casting is shaped to provide a receptacle 131, the upper end thereof being in communication with the inlet end 119 of the casting, while the lower portion of this receptacle is in communication with the discharge end 123 of the casting.

At the entrance to this chamber, there is located a check valve 133 having special characteristics and design, whereby the same in one direction, will function to block flow of liquid thereby up to a predetermined pressure and thereafter permit flow therethrough, while in the reverse direction the valve will offer very little if any resistance to the flow of liquid.

Structurally, the valve comprises a stem 135 having limited sliding movement within lower and upper end supporting bearings 137 and 139 respectively. The lower is formed in the floor of the chamber 131 while the other is formed in the spider 141 threadably mounted at the entrance to the chamber. Just slightly below the spider, the casting is formed to provide a circular valve seat 143. Threaded to the stem is one element of a composite valve, such element being in the form of a disc 145 having a plurality of tapered openings 147 therethrough. At the lower end of the stem 135, a spring retainer 149 is threaded thereon for supporting a compression spring 151 which in its normally fully expanded condition is of a length sufficient to hold a second disc-like element 153 in light pressure contact with the other disc element 145 of the composite valve.

The upper part of the casting 117 is formed with an externally threaded connection 155 to threadedly receive a cap 157 forming a float chamber. The upper end or roof of this chamber is provided with a vent 159 to the atmosphere.

Enclosed within this chamber is a float 161 formed with an axially disposed teat 163 at its upper end, adapted upon upward movement of the float to temporarily seal the vent 159. Downward movement of the float is restricted by the threaded connection 155, against the end of which the float will settle, should the liquid level in the float chamber drop below a predetermined point.

In the operation of the system of Figure 8, the pressure tank 3 will be charged directly from the pump. The constants of the spring 151 are such that the disc 153 will not open and expose the main flow passage to the tank until the pressure of the incoming liquid has reached a certain minimum value necessary to assure proper functioning of the venturi 125 in drawing in air through the Schrader valve 129. When such minimum pressure value has been reached, however, the liquid pressure against the disc 153 will overcome the compression of the spring 151, thereby opening the main flow passage to the pressure tank, to the incoming liquid. During such charging operation, the pump is free to supply the service line, should any demands be made upon the system by the consumer.

Following cessation of the pumping cycle, the service line will, of course, be supplied from the pressure tank. In this connection, it is important to note that the composite valve offers no restriction to the flow of liquid from the tank by way of the main flow passage to the service line, for as long as there is pressure in the tank, the outward flow of liquid therefrom may readily lift the entire valve assembly including valve disc 145 from its seat, which thereby opens the passage to the flow of liquid therethrough.

Should water be drawn from the tank faster than the same can be replaced, air would normally be drawn from the tank into the service line, a condition which would be objectionable, but this is prevented in the system described by the float 161 in its associated float chamber 157, which float will drop with the liquid level, thereby exposing the float chamber to the atmosphere. Inasmuch as the pressure on the inside of the system will be greater than that of atmospheric pressure, such air as would otherwise escape into the service line will be blown out through the vent.

Were the service line of Figure 8 connected directly from the pressure tank at a point below the level of the input connection to the tank, instead of as illustrated, the composite valve assembly 133 could be dispensed with. This would result in some simplification of the system, but on the other hand, however, the modified system would not embody whatever advantages exist in having the service line supplied directly by either the pump or the pressure tank as previously indicated.

In Figure 9, I have illustrated another form or embodiment of my invention, utilizing a casting 171 having aligned openings 173 and 175 internally threaded to receive respectively, a connection 177 from a pump, and a connection 179 from the pressure tank 3. At an intermediate point, the casting is formed with an internally threaded discharge opening 181 for connection to a service line.

Dividing the interior of the casting in a manner such as to leave a clear passage between the opening 173 and the service line opening 181, is an irregularly shaped partition 183, in the upper portion of which a threaded opening is formed to receive and support a venturi 185 directed toward the pressure tank.

A depending boss 187 between the venturi and the input opening 173 to the casting, supports a nozzle 189 in axial alignment with the venturi, said nozzle having connection to the outside through a longitudinal passage 191 in the boss. The nozzle is thereby adapted for connection either to a Schrader valve as in Figure 4, or to a tube 25 as in Figures 1 through 3.

That portion of the partition below the venturi is designed to provide an upper and a lower bearing 193 and 195 respectively, and an intermediate valve seat 197, all in alignment, to receive a composite valve 133 like that illustrated and described in connection with Figure 8.

With the arrangement of Figure 9, the pump can discharge directly into the service line. Similarly, if the pump is not operating, the full flow of the water from the tank can pass through the composite valve 133 with practically no opposition, and enter the service line. The only time that the flow is restricted is when the tank is building up to pressure and the spring biased composite valve reduces this restriction to a minimum, since it is designed to open when the pressure at the venturi is sufficient to assure proper aspirator action, and thereafter permit full flow into the pressure tank.

With respect to the arrangements illustrated in Figures 8 and 9, the aspirator assembly may be modified to accord with the teachings of any of Figures 5, 6 and 7.

The invention has been described as applied to a pump pressure system. The same principles may, however, be applied to any pneumatic water or other system, even though such system may not embody a pump. For example, in a system where "water hammer" is likely to develop, as in a hot water heating system, it becomes apparent that an air cushion will serve to prevent the occurrence of such phenomenon. In such system, the flow of liquid may be relied on to establish and maintain such a cushion.

From the above description of the many embodiments illustrated, it is apparent that the same fulfill the objects of my invention as previously set forth, and while I have described the invention in considerable detail, it becomes apparent that the same is subject to alteration or modification without departing from the underlying principles thereof. I accordingly do not desire to be limited in my protection to such details, except as may be required by the appended claims.

I claim:

1. An assembly comprising a coupling having a passage therethrough, a venturi lying in said passage, means including a spring biased valve normally closing the passage about said venturi and adapted to open when pressure in said passage on the intake side of said valve is sufficient to produce sub-atmospheric pressure in the restricted portion of said venturi, and a passage into said coupling and terminating adjacent the restricted portion of said venturi.

2. An assembly comprising a coupling having a passage therethrough, a venturi lying in said passage, means including a valve normally closing the passage about said venturi and adapted to open in the direction of discharge of said venturi in response to pressure above a predetermined value, and an independent passage into said coupling and terminating adjacent the restricted portion of said venturi.

3. An assembly comprising a coupling having a passage therethrough, a venturi lying in said passage, means including a spring biased valve normally closing the passage about said venturi and adapted to open in the direction of discharge of said venturi, and a passage through a wall of said coupling and terminating adjacent the restricted portion of said venturi.

4. In combination, a pressure tank, a consumer's discharge connection from said tank, an aspirator in said connection for creating a region of reduced pressure therein, in response to liquid flow therethrough, a passage leading from such region of reduced pressure to the interior of said pressure tank at substantially the desired water level of said pressure tank, said passage including a chamber, means providing valve communication from the atmosphere to said chamber, and means for precluding flow of air from said chamber into said consumer's discharge connection.

5. In combination, a pressure tank, an inlet connection to said tank, a discharge connection from said tank leading to a consumer's outlet, an aspirator in said discharge connection for creating a region of reduced pressure therein, in response to liquid flow therethrough to a consumer, a passage leading from such region of reduced pressure to the interior of said pressure tank at substantially the desired water level of said pressure tank, said passage including a chamber, means providing valve communication from the atmosphere to said chamber, and means for precluding flow of air from said chamber into said consumer's discharge connection.

6. In combination, a pressure tank, an inlet connection to said tank, a discharge connection from said tank leading to a consumer's outlet, an aspirator in said discharge connection for creating a region of reduced pressure therein, in response to liquid flow therethrough, a passage leading through a wall of said aspirator from such region of reduced pressure to the interior of said pressure tank at substantially the desired water level of said pressure tank, said passage including a chamber, means providing valve communication from the atmosphere to said chamber, and means for precluding flow of air from said chamber into said consumer's discharge connection.

7. A pump pressure system comprising a pump having an intake opening and a discharge opening; a pressure tank having a discharge line leading therefrom to a consumer's outlet; means connecting said pressure tank to receive the discharge from said pump; means responsive to liquid flow through said discharge line from said pressure tank for creating a region of sub-atmospheric pressure to suck air into said system, said flow-responsive means including an air inlet valve, and a flow connection from the region of such sub-atmospheric pressure to said air inlet valve; and means for causing such air to enter said pressure tank following cessation of such liquid flow, said last means including a branch of said flow connection leading to said pressure tank at a desired water level therein.

8. A pump pressure system comprising a pump having an intake opening and a discharge opening; a pressure tank having a discharge line leading therefrom to a consumer's outlet; means connecting said pressure tank to receive the discharge from said pump; and means coupled to said discharge line and responsive to the liquid flow therethrough for introducing air into said pressure tank, said means including an air inlet valve, means connected to said discharge line for creating a region of reduced pressure when exposed to liquid flow in said pressure tank discharge line, a flow connection from said air inlet valve to said region of reduced pressure, and a branch of said flow connection leading to said pressure tank at a desired level therein.

9. In a fluid pressure system including a liquid pressure tank and a pump therefor, an air replenishing device having a liquid chamber communicating with the pressure side of said pump and with a service outlet, a Venturi type tube interposed between said chamber and tank through which liquid is forced by said pump under pressure, an auxiliary passage between said chamber and tank having a normally closed spring pressed valve therein through which liquid may pass under pressure from the pump supply line to said tank by-passing said Venturi tube, and a passage between the restricted throat of said Venturi tube and a predetermined liquid level in said tank, said passage including means for admitting air from the atmosphere directly to said Venturi tube upon the liquid level in said tank extending above said predetermined level.

JOSEPH JACUZZI.

(References on following page)

REFERENCES CITED

The following references are of record in the file of this patent:

UNITED STATES PATENTS

| Number | Name | Date |
|---|---|---|
| 979,633 | Aaron | Dec. 27, 1910 |
| 1,671,851 | Brown | May 29, 1928 |
| 2,135,962 | Conery et al. | Nov. 8, 1938 |
| 2,172,057 | Burks | Sept. 6, 1939 |
| 2,215,132 | Parker | Sept. 17, 1940 |
| 2,218,507 | Day | Oct. 22, 1940 |
| 2,279,948 | Kent | Apr. 14, 1942 |
| 2,288,437 | Conery et al. | June 30, 1942 |
| 2,291,746 | Nelson et al. | Aug. 4, 1942 |
| 2,319,554 | Penn et al. | May 18, 1943 |
| 2,347,472 | Dorward | Apr. 25, 1944 |
| 2,354,811 | Jacuzzi | Aug. 1, 1944 |
| 2,421,237 | Bergh | May 27, 1947 |
| 2,457,863 | Burks | Jan. 4, 1949 |

FOREIGN PATENTS

| Number | Country | Date |
|---|---|---|
| 574,797 | France | 1924 |
| 639,184 | Germany | 1936 |
| 707,368 | France | 1931 |
| 777,853 | France | 1935 |